United States Patent

Yoshida et al.

[11] Patent Number: 5,568,326
[45] Date of Patent: Oct. 22, 1996

[54] CAR REARVIEW MIRROR

[75] Inventors: Norio Yoshida, Isehara; Osamu Tsuyama, Hiratsuka, both of Japan

[73] Assignee: Ichikoh Industries, Ltd., Tokyo, Japan

[21] Appl. No.: 535,911

[22] Filed: Sep. 28, 1995

[30] Foreign Application Priority Data

Oct. 6, 1994 [JP] Japan ................ 6-242933
Jan. 9, 1995 [JP] Japan ................ 7-001254

[51] Int. Cl.$^6$ ................ G02B 7/182; B60R 1/06
[52] U.S. Cl. ................ 359/872; 359/877; 248/478; 248/481
[58] Field of Search ................ 359/871, 872, 359/874, 876, 877; 248/477, 478, 479, 481, 487

[56] References Cited

U.S. PATENT DOCUMENTS

| | | | |
|---|---|---|---|
| 2,112,656 | 3/1938 | Ponce | 248/481 |
| 2,146,859 | 2/1939 | Seklehner | 359/871 |
| 2,710,734 | 6/1955 | Haberstump | 248/481 |
| 3,339,877 | 9/1967 | Valenzuela | 248/481 |
| 4,158,483 | 6/1979 | Fisher et al. | 359/877 |
| 4,167,306 | 9/1979 | Longland | 359/877 |
| 4,640,142 | 2/1987 | Cummins et al. | 359/872 |
| 4,764,004 | 8/1988 | Yamada et al. | 350/632 |
| 4,776,231 | 10/1988 | Cummins et al. | 359/872 |
| 4,988,179 | 1/1991 | Stensland | 359/877 |
| 4,991,950 | 2/1991 | Lang et al. | 359/877 |
| 5,363,246 | 11/1994 | Perry et al. | 248/483 |

FOREIGN PATENT DOCUMENTS

| | | | |
|---|---|---|---|
| 0548065 | 10/1957 | Canada | 248/481 |
| 1196267 | 6/1970 | United Kingdom | 248/481 |

*Primary Examiner*—Ricky D. Shafer
*Attorney, Agent, or Firm*—Foley & Lardner

[57] ABSTRACT

A car rearview mirror comprises a mirror unit having a hemispheric convex surface formed thereon and a central support formed integrally therewith on the opposite side to the hemispheric convex surface to receive a leaf or wire spring at the center of the latter, and a mirror housing having a hemispheric concave surface formed thereon and two end supports formed integrally therewith to retain the spring at the opposite ends, respectively, of the latter. The hemispheric convex surface of the mirror unit is fitted to the hemispheric convex surface of the mirror housing in such a manner that the mirror unit can be pivoted in relation to the mirror housing. To assemble the rearview mirror, the spring is bowed and supported at the center thereof on the central support and at the opposite ends thereof on the two end supports. Namely, the car rearview mirror can have a reduced number of parts.

13 Claims, 9 Drawing Sheets

CAR REARVIEW MIRROR

BACKGROUND OF THE INVENTION a) Field of the Invention

The present invention relates to a rearview mirror mounted outside a car and in which a mirror unit is pivotably supported on a mirror housing, such as a remote- or manually-controllable mirror, and more particularly to a car rearview mirror composed of a reduced number of parts.

b) Related Art Statement

Many car rearview mirrors that are mounted outside a car have so far been proposed. A typical one is disclosed in the U.S. Pat. No. 4,764,004.

Figure 1:
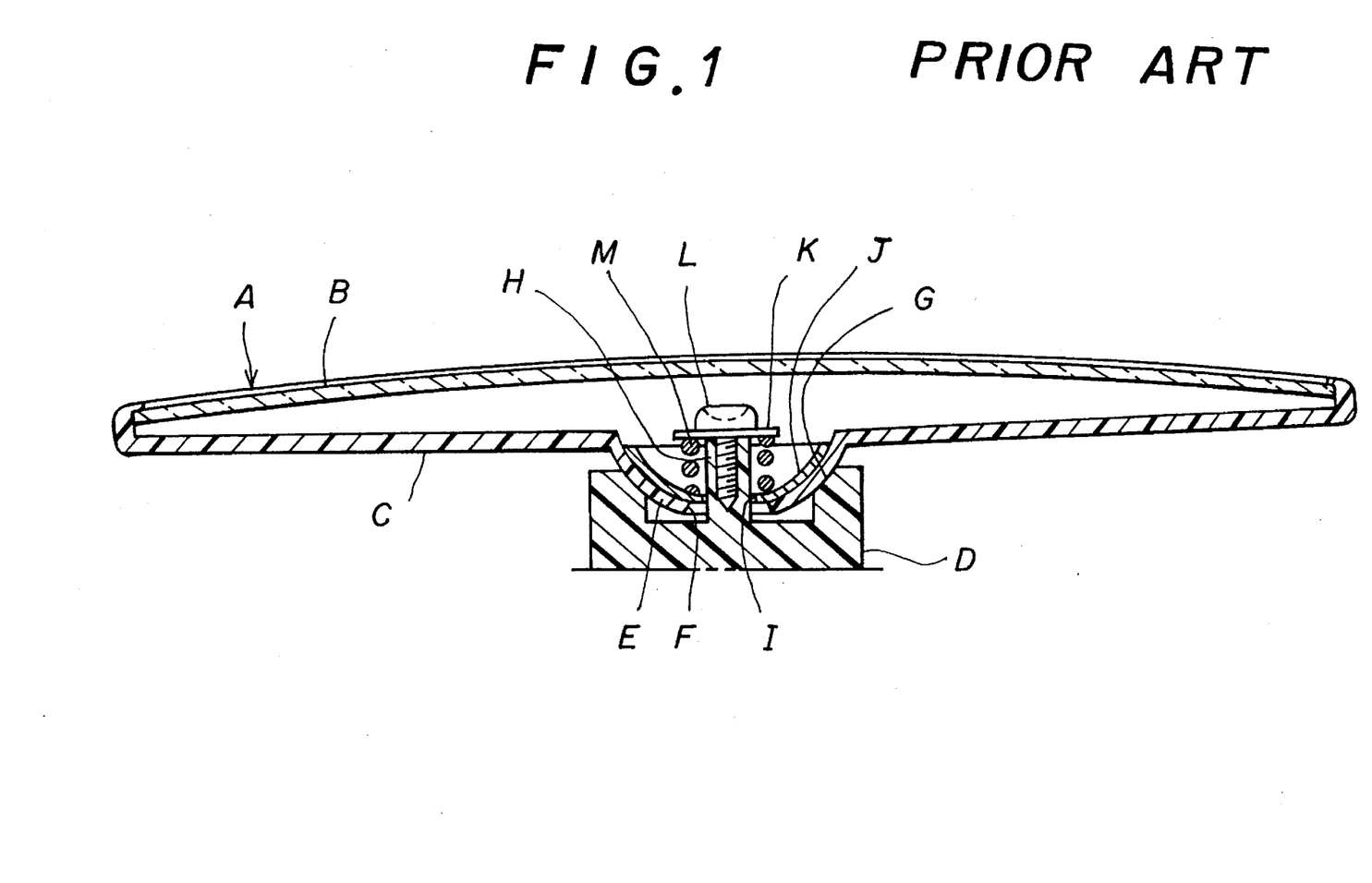
FIG. 1 is a partially sectional view of a prior-art car rearview mirror.

As illustrated in FIG. 1, this prior-art car rearview mirror has a mirror unit A (composed of a mirror body B having a reflecting surface on the front side thereof, and a back plate C disposed at the rear side of the mirror body B) pivotably mounted directly to a mirror housing D or tiltably mounted to the mirror housing D by means of a power unit (not shown) which is remote-controlled to tilt or turn the mirror unit A vertically (about the horizontal axis of the mirror unit) and horizontally (about the vertical axis of the mirror unit).

More specifically, the mirror unit A has a hemispheric fixture E formed integrally at the center of the back plate C thereof. The hemispheric fixture E has a through-hole F formed in the center thereof. On the other hand, a hemispheric concave surface G is formed either directly on the mirror housing D or on the power unit fixed inside the mirror housing O, and a boss H is formed integrally at the center of the hemispheric concave surface G.

To assemble this rearview mirror, a hemispheric washer J having a through-hole I formed in the center thereof is put on the inner hemispheric concave surface of the fixture E, and then the boss H of the mirror housing D is passed through the holes F and I in the fixture E and hemispheric washer J, respectively, thereby applying the hemispheric convex surface of the fixture E of the mirror unit A to the hemispheric concave surface G of the mirror housing D. Next, a coil spring M is fitted onto the boss H, a plain washer K is put on the top end of the coil spring M, and a screw L is driven into the boss H from the free end of the latter, to thereby fix the plain washer K there and hold the coil spring M as compressed between the hemispheric washer J and plain washer K.

Namely, the coil spring M compressed between the hemispheric washer J and plain washer K works on the hemispheric washer J which in turn will force the outer hemispheric convex surface of the fixture E to the hemispheric concave surface G. Thus, the mirror unit A is pivotally held on the mirror housing D. The mirror unit A can be tilted relative to the mirror housing D by hand or by means of the power unit (not illustrated).

As known from the foregoing description, this prior-art rearview mirror uses many parts including the hemispheric washer J, plain washer K, screw L and coil spring M, in addition to the mirror unit A and mirror housing D.

SUMMARY OF THE PRESENT INVENTION

The present invention has an object to provide a car rearview mirror comprising a reduced number of parts and in which a leaf or wire spring is used to positively hold the mirror unit on the mirror housing.

The prevent invention has another object to provide a car rearview mirror in which the wire spring adopted to hold the mirror unit on the mirror housing can be easily installed.

The car rearview mirror according to the present invention comprises a mirror unit having a hemispheric convex surface and a mirror housing having a hemispheric concave surface on which the hemispheric convex surface of the mirror unit is pivotally supported. The mirror unit is provided with a central support for a leaf or wire spring while the mirror housing is with two end supports for the spring. The leaf or wire spring is received at the center thereof on the top of the central support of the mirror unit and retained at the opposite ends thereof by the end supports of the mirror housing. Thus the spring is forced inwardly by the end supports while it is forced outwardly by the central support, so that the mirror unit is pivotally fitted to the mirror housing. That is to say, the rearview mirror according to the present invention uses only the spring in addition to the mirror unit and mirror housing. It is composed of a much smaller number of parts than the prior-art rearview mirrors.

Also, according to the present invention, the wire spring may be received at the center thereof in a substantial point contact on a pin fixed to the top of the central support perpendicularly thereto, and have a first end formed like a small loop and which is to be fixed to one of the two end supports with a screw and a second end consisting of a bend extending generally in parallel with the central axis through the looped end and an extreme portion contiguous to the bend and extending straight in a direction away from the first end. The other end support has two abutments extending axially of the screw in the one end support and a through-hole formed in the rest thereof. The through-hole extends along the bottom of a space defined between the two abutments.

To assemble the rearview mirror according to the present invention, the extreme portion of the wire spring is inserted into the through-hole in the other end support and the bend is set between the two abutments of the other end support, so that both the lateral sides of the bend are retained between the two abutments. The extreme portion at the second end of the wire spring is retained on the wall surface of the through-hole in the other end support, and the wire spring is supported at the center thereof in a substantial point contact on the pin fixed to the top of the central support. Thereafter, the first end of the wire spring is fixed to the one end support with the screw. Since the wire spring is thus prevented from rotating about the axis thereof, it can be easily installed.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Three preferred ones of various embodiments of the car rearview mirror according to the present invention will be described hereinafter referring to FIGS. 2 through 16.

FIGS. 2 to 5 show together the first embodiment of the car rearview mirror according to the present invention.

Figure 2:
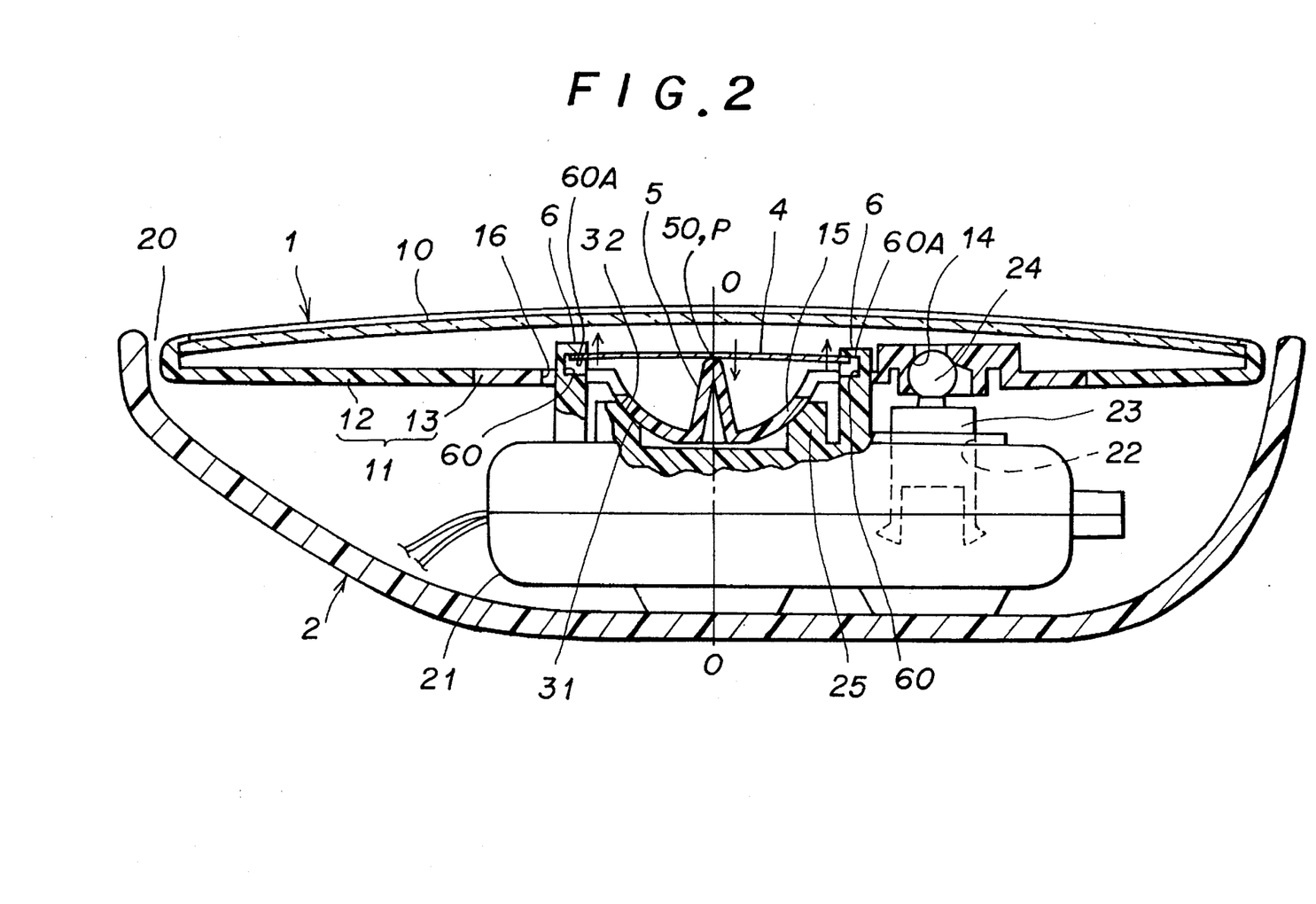
FIG. 2 is a sectional view of a first embodiment of the car rearview mirror according to the present invention in which a leaf spring is used to support the mirror unit on the mirror housing.
Figure 3:
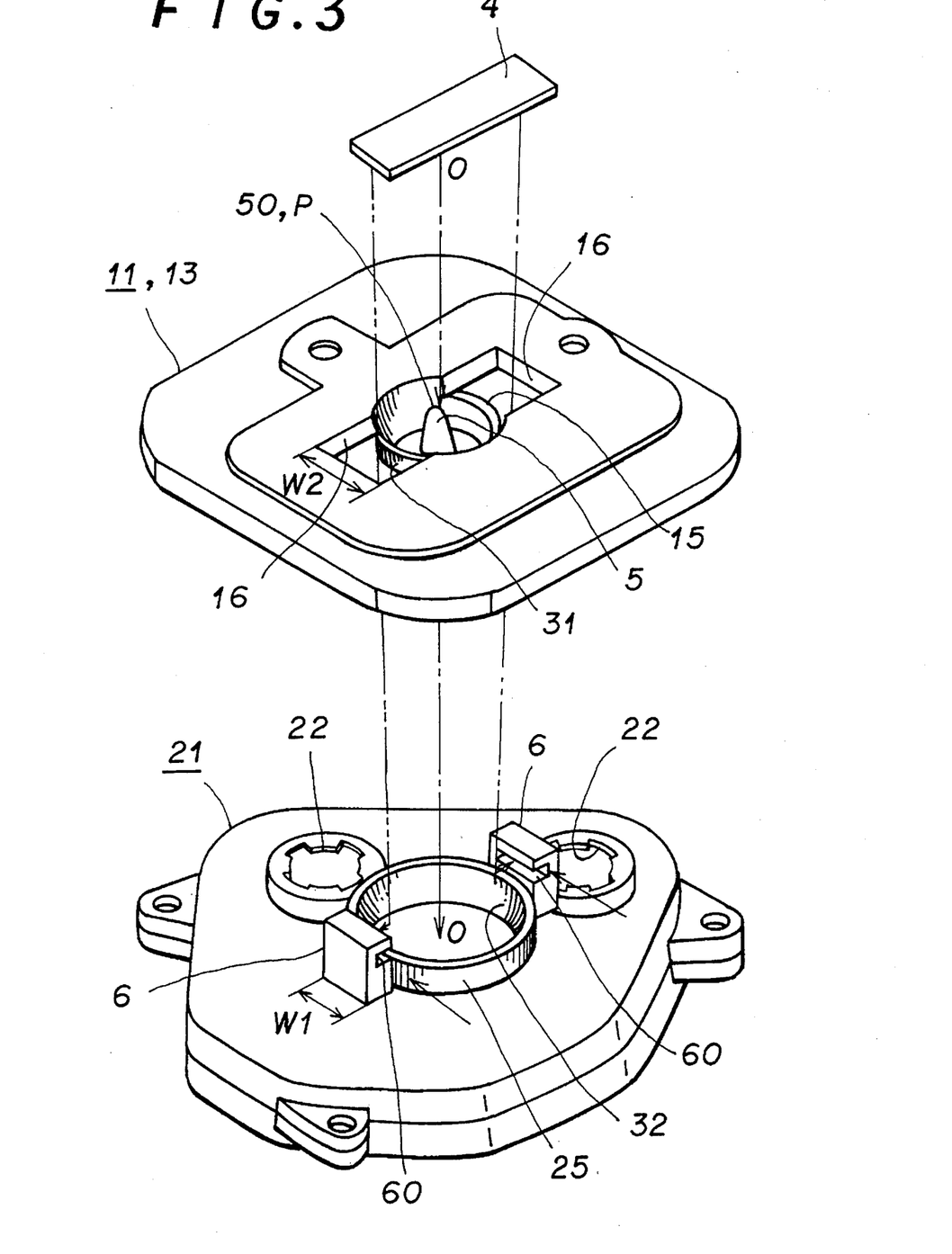
FIG. 3 is an exploded perspective view of the base of the mirror unit, power unit and leaf spring in the rearview mirror in FIG. 2.

As seen in the Figures, the rearview mirror comprises a mirror unit 1 and a mirror housing 2.

The mirror unit 1 is composed of a mirror body 10 having a reflecting surface on the front side thereof, and a back plate 11 disposed behind the mirror body 10. The mirror body 10 is a convex plate somewhat projecting forwardly. It should be noted, however, that the front surface of this mirror body 10 may be flat. The back plate 11 is an assembly of a holder 12 and a base 13. The holder 12 is to receive the circumference of the mirror body 10. The holder 12 and base 13 are separate pieces fitted to each other to form an integral assembly (back plate 11). This fitting is effected after the base 13 is installed to the mirror housing 2.

As seen, the mirror housing 2 has a hollow structure open at the front thereof, as indicated with a reference numeral 20. It has disposed therein a power unit 21 that is remote-controlled to tilt or turn the mirror unit 1 vertically (about the horizontal axis of the mirror unit 1 itself) and horizontally (about the vertical axis of the mirror unit 1 itself).

The power unit 21 comprises a casing that consists of an upper half and a lower half, which can be split, a motor for tilting the mirror unit horizontally (not shown) and a motor for tilting the mirror unit vertically (not shown), both disposed inside the casing, a plunger 23 extending to the front of the mirror housing 2 through a through-hole 22 and installed movably back and forth for horizontal turning of the mirror unit 1 and another plunger similar to the plunger 23 and which is configured for vertical turning of the mirror unit 1. Note that only the plunger 23 is shown in the Figures for the simplicity of the illustration. The plunger 23 has a base end coupled to the motor, and has a pivot 24 formed at the front end thereof. The pivot 24 is pivotably fitted in a pivot receiver 14 formed in the base 13 of the mirror unit 1, and it is configured for horizontal turning of the mirror unit 1. Thus, the mirror unit 1 is installed by means of the power unit 21 in such a manner that it can be tilted vertically and horizontally and the reflecting surface thereof is positioned in the opening 20.

As illustrated, the mirror unit 1 has a hemispheric convex surface 31 formed on the base 13 thereof. More specifically, the base 13 has formed integrally therewith a generally hemispheric convex portion 15 projecting downward (backward). That is to say, the rear or bottom surface of the convex portion 15 is the convex surface 31. On the other hand, the power unit 21 has a hemispheric concave surface 32 formed thereon. More particularly, the power unit 21 has an annular projection 25 formed integrally on the top of the casing thereof facing the front of the mirror housing 2. The annular projection 25 is reamed along the inner circumferential edge thereof to provide the hemispheric concave surface 32. The base 13 of the mirror unit 1 is pivotably fitted at the hemispheric convex surface 31 thereof to the hemispheric concave surface 32 of the annular projection 25 on the power unit 21.

The hemispheric convexity 31 and hemispheric concavity 32 are generally identical in radius of curvature to each other and also generally concentric to each other (at a point P). The centers P of the convexity 31 and concavity 32 lie on a line O—O generally perpendicular to the mirror body 10.

As shown in the Figures, the first embodiment of the rearview mirror according to the present invention employs an elongated, rectangular spring (will be referred to as "leaf spring" herein) 4 made of a thin resilient steel sheet to support the mirror unit 1 on the mirror housing 2.

As seen from the Figures, the hemispheric convex portion 15 of the base 13 of the mirror unit 1 is projected at the center thereof toward the front of the mirror unit 1 as indicated with a reference numeral 5. This central projection 5 will be referred to as "central support" herein. It is configured to receive the leaf spring 4 at the center of the latter at a position near the centers P of the hemispheric convexity 31 and concavity 32. As shown, the central support 5 has a conical shape and is rounded nearly like a hemisphere at the top thereof as indicated with a reference numeral 50. The top 50 of the central support 5 lies nearly at the centers P of the hemispheric convexity 31 and concavity 32. Also, the axis of the central support 5 generally coincides with the above-mentioned line O—O.

The power unit 21 has two upright blocks 6 formed integrally on the side thereof facing the mirror housing 2. Each of the two upright blocks 6 has the shape of a rectangular parallelepiped and which are to hold or retain the opposite ends, respectively, of the leaf spring 4. These blocks will be referred to as "end supports" herein. They are disposed across the annular projection 25.

The base 13 of the mirror unit 1 has two rectangular windows 16 formed therein correspondingly to the end supports 6 across the hemispheric convex portion 15. The end portions of the two end supports 6 are to be fitted in the two rectangular windows 16, respectively. Each of the end supports 6 has a recess 60 formed in the upper portion thereof. The recess 60 is nearly perpendicular to the deflecting direction of the leaf spring 4. The recess 60 in the second supports 6 has a front (upper) wall surface 60A which is in such a geometrical relation with the top 50 of the central support 5, when the power unit 21 is installed in place, as to be lower than the top 50 of the central support 5.

To assemble the rearview mirror, the leaf spring 4 is to be bowed and inserted at the opposite ends thereof into the respective recesses 60 in the two end supports 6 in the direction of arrows in FIG. 3. While the leaf spring 4 is being held with the opposite ends thereof applied to the respective upper wall surfaces 60A, it is to be deflected upwardly and put at the center thereof on the top 50 of the central support 5.

As described above, the leaf spring 4 is supported at the center and opposite ends thereof by the central support 5 and two end supports 6, respectively. In this condition, the leaf spring 4 is deflected at the center thereof in one direction and at the opposite ends thereof in the other direction as shown in FIG. 2. As indicated with the arrows in FIG. 2, the hemispheric convex surface 31 and hemispheric concave surface 32 are forced to each other under the resilience of the leaf spring 4 so that the mirror unit 1 is pivotable relative to the mirror housing 2. Assembling of the rearview mirror according to the present invention is finished by supporting the mirror unit 1 pivotably to the mirror housing 2.

As having been described in the foregoing, the rearview mirror according to the present invention consists of a smaller number of parts than that in the prior-art rearview mirrors, for it comprises only the leaf spring 4 in addition to the mirror unit 1 and mirror housing 2.

Generally speaking, it is difficult to manufacture a hemispheric surface with a high precision. In this embodiment, however, the hemispheric surfaces being in contact with each other include only the hemispheric convex surface 31 of the base 13 of the mirror unit 1 and the hemispheric concave surface 32 of the power unit 21 in the mirror housing 2. (In the previously described prior-art rearview mirror cited by way of example, the hemispheric surfaces are in contact at two places with each other; namely, the outer hemispheric convex surface of the fixture E is in contact with the hemispheric concave surface G and the hemispheric washer J is in contact with the inner hemispheric concave surface of the fixture E.) Therefore, the mirror unit 1 can be securely held on the mirror housing 2.

Also, according to this embodiment, the width W1 of the two end supports 6 is nearly equal to, and smaller to such an extent than, the width W2 of the window 16 in the base 13 that the end supports 6 can be inserted into the windows 16, respectively. Therefore, it is possible to prevent the mirror unit 1 from being oscillated about the line O—O (axis of the central support 5) in relation to the mirror housing 2 while the car is running.

Further, in this embodiment, the leaf spring 4 is received at the center thereof in a substantial point contact on the top 50 of the central support 5 nearly at the centers P of the hemispheric convex surface 31 and hemispheric concave surface 32. Therefore, the leaf spring 4 will not possibly be deviated from the central support 5 even when the mirror unit 1 is tilted. The leaf spring 4 will thus force the hemispheric convex surface 31 to the hemispheric concave surface 32 uniformly over the entire surfaces of the latter, thereby permitting a smooth tilting of the mirror unit 1.

In this embodiment of the car rearview mirror according to the present invention, the plunger 23 for horizontal tilting of the mirror unit 1 is moved back and forth as driven by the motor provided for this purpose in the power unit 21 to tilt the mirror unit 1 horizontally relative to the mirror housing 2 (in relation to the vertical line passing through the centers P of the hemispheric convex surface 31 and hemispheric concave surface 32). Also, the plunger for vertical tilting of the mirror unit 1 is moved back and forth as driven by the motor provided for this purpose in the power unit 21 to tilt the mirror unit 1 vertically relative to the mirror housing 2 (in relation to the horizontal line passing through the centers P of the hemispheric convex surface 31 and hemispheric concave surface 32).

Figure 4:
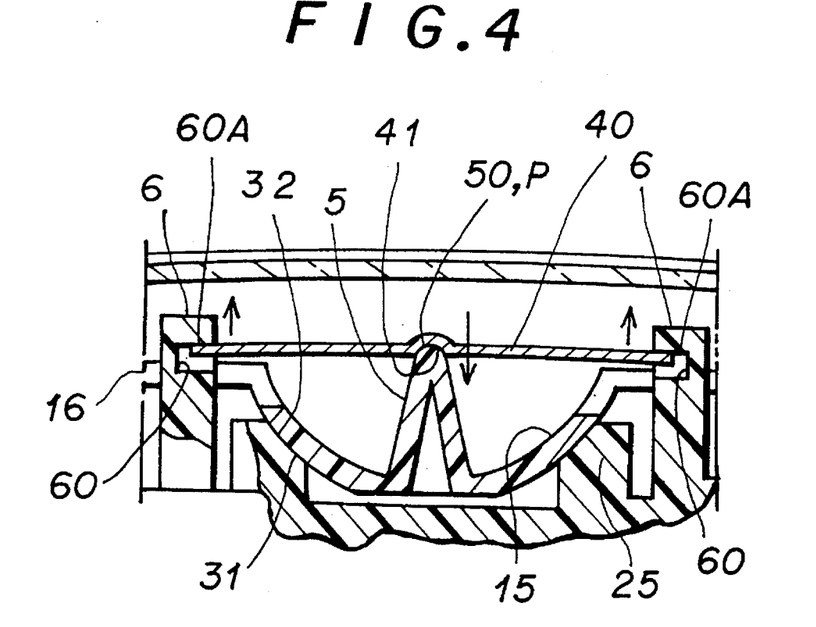
FIG. 4 is a fragmentary sectional view, enlarged in scale, of a variant of the leaf spring.

FIG. 4 is a fragmentary sectional view, enlarged in scale, of a leaf spring 40 used in place of the leaf spring 4. This leaf spring 40 has a small concavity 41 formed in the bottom center thereof. The top 50 of the central support 5 is fitted in this concavity 41. In this case, it is possible to positively limit the leaf spring 40 from being deviated from the central support 5.

Figure 5:
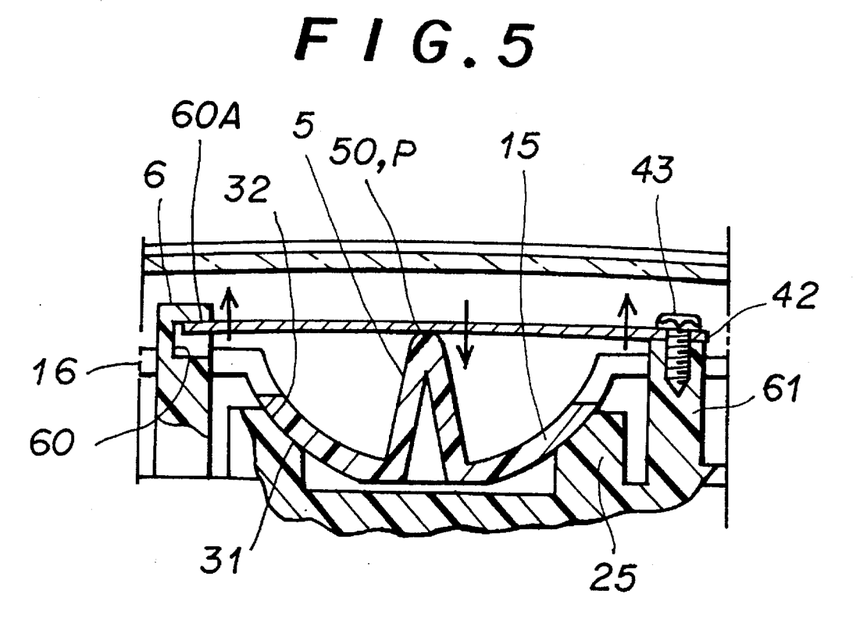
FIG. 5 is a fragmentary sectional view, enlarged in scale, of the leaf spring fixed in a different manner.

FIG. 5 is a fragmentary sectional view, enlarged in scale, of a leaf spring 42 which is fixed to the end supports 6 in a different manner from those in which the aforementioned leaf springs are installed.

The leaf spring 42 has one end thereof fixed to the top of a solid end support 61 with a screw 43. In this case, the leaf spring 42 can be more positively limited from being deviated from the central support 5.

FIGS. 6 to 9 show together a second embodiment of the car rearview mirror according to the present invention in which a wire spring is employed in place of the aforementioned leaf springs. In these Figures, the same or like parts as those in FIGS. 2 to 5 are indicated with the same or like reference numerals as in FIGS. 2 to 5.

The second embodiment shown in FIGS. 6 to 9 uses a wire spring 400 made of, for example, a resilient steel wire having a circular section, in place of the leaf springs in the first embodiment.

Figure 7:
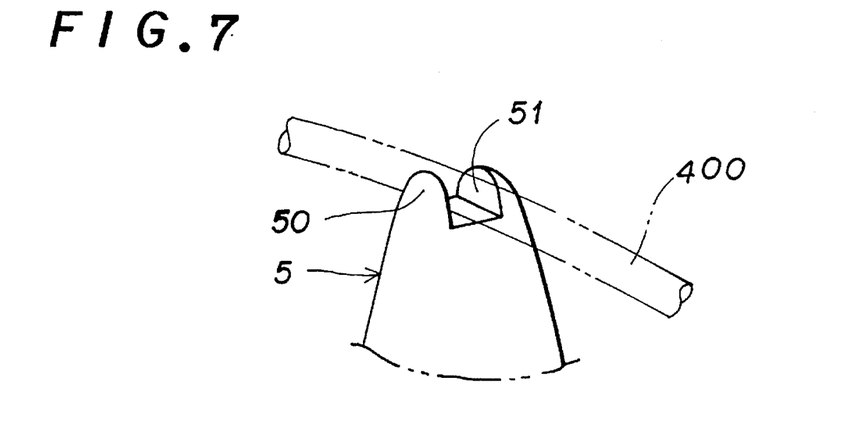
FIG. 7 is a fragmentary perspective view, enlarged in scale, of the wire spring and central support.

The top 50 of the central support 5 is recessed at the center thereof as indicated with a reference numeral 51 to prevent the wire spring 400 from being deviated from the central support 5. The recess 51 has a width and depth generally equal to, or a little larger than, the outside diameter of the wire spring 400.

Figure 6:
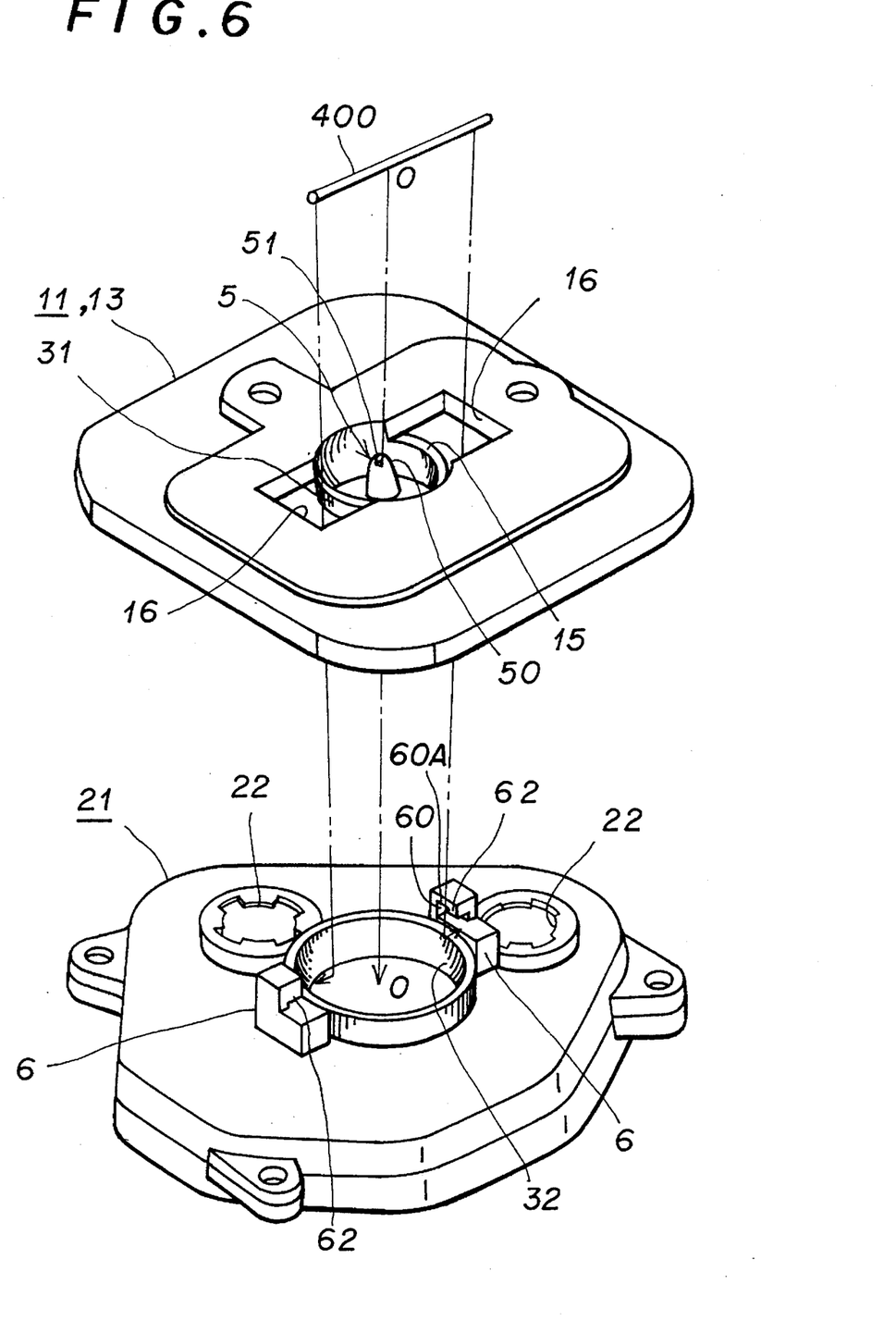
FIG. 6 is an exploded perspective view of the base of the mirror unit, power unit and a wire spring in a second embodiment of the car rearview mirror according to the present invention.

On the other hand, each of the end supports 6 has a stopper 62 formed integrally therewith at the opening of the recess 60, which receives the end of the wire spring 400 to prevent it from going out of the recess 60.

To assemble the rearview mirror, the wire spring 400 is to be bowed and inserted at the opposite ends thereof into the respective recesses 60 in the two end supports 6 beyond the stoppers 62 similarly to the leaf spring 4 in the first embodiment. With the opposite ends of the wire spring 400 applied to the upper (front) wall surfaces of the recesses 60, respectively, in the end supports 6, the wire spring 400 is put at the center thereof onto the bottom of the recess 51 in the top 50 of the central support 5. Thus, the hemispheric convex surface 31 and hemispheric concave surface 32 are forced to each other under the resilience of the wire spring 400 so that the mirror unit 1 and the mirror housing 2 are pivotable relative to each other.

The second embodiment of the rearview mirror according to the present invention offers a same effect as the previously-mentioned first embodiment.

More specifically, the fitting of the wire spring 400 in the recess 5 of the central support 5 and the retention of the opposite ends of the wire spring 400 by the stoppers 62 of the end supports 6 permit to positively limit the wire spring 400 from being deviated from the predetermined position.

Figure 8:
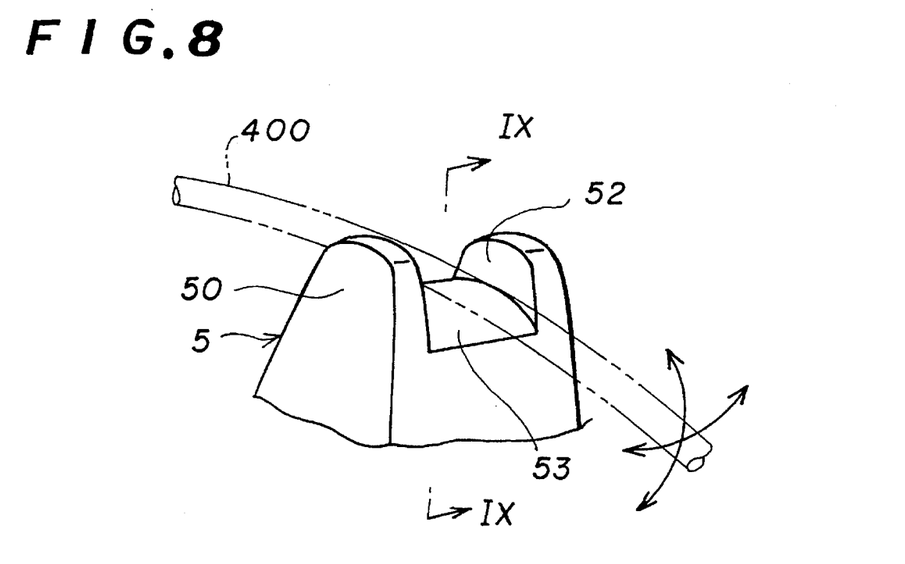
FIG. 8 is a fragmentary perspective view, enlarged in scale, of the wire spring and a variant of the central support.
Figure 9:
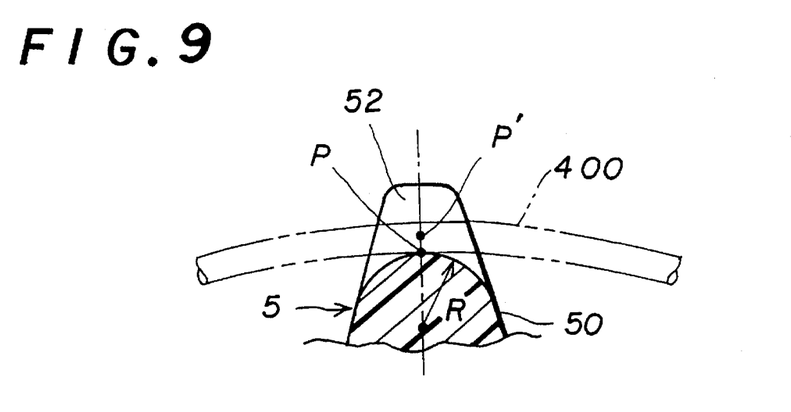
FIG. 9 is a sectional view taken along the line IX—IX in FIG. 8.

FIGS. 8 and 9 show together a spring receiving recess 52 formed, in lieu of the aforementioned recess 51, in the top 50 of the central support 5 in second embodiment.

The recess 52 in the central support 5 is larger in width and depth than the outside diameter of the wire spring 400. The recess 52 has a bottom 53 of which the surface is curved as a part of a circle having a radius R. Therefore, the wire spring 400 has a substantial point contact with the curved bottom 53 of the recess 52. The point of this contact generally coincides with the centers P of the hemispheric convex surface 31 and hemispheric concave surface 32. It should be noted that the centers P of these surface 31 and 32 may be made to coincide with the center P' of the wire spring 400 received on the bottom 52 of the recess 52.

This variant of the spring receiving recess 52 facilitates the wire spring 400 to oscillate, which contributes to a correspondingly smoother tilting of the mirror unit 1.

FIGS. 10 to 16 show together the third embodiment of the car rearview mirror according to the present invention in which a wire spring is also used. In these Figures, the same or like parts as those in FIGS. 2 to 9 are indicated with the same or like reference numerals as in FIGS. 2 to 9.

Figure 15A:
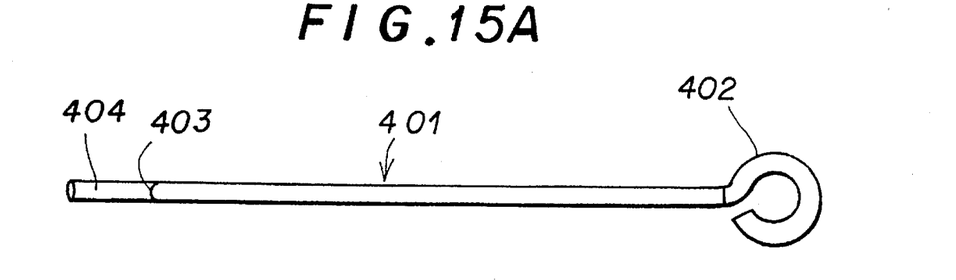
FIG. 15A is a plan view of the wire spring.
Figure 15B:
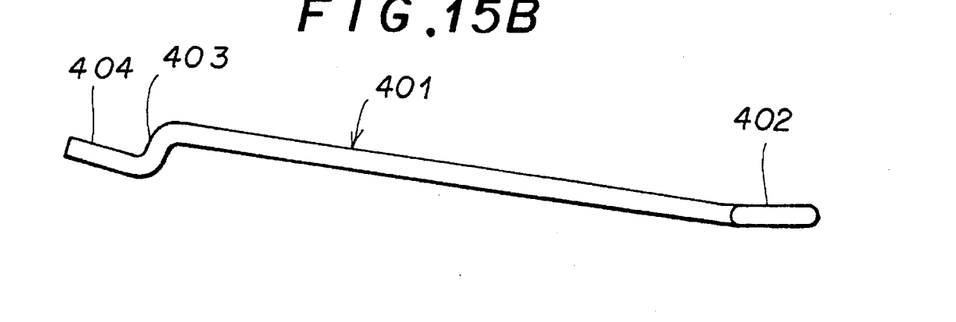
FIG. 15B is a side elevation of the wire spring.

As seen, this embodiment uses a wire spring 401 ended at the first end thereof by a loop as indicated with a reference numeral 402 and at the second end by a crank consisting of a bend 403 extending generally in parallel with the central axis through the looped end 402 and an extreme portion 404 contiguous to the bend 403 and extending straight in a direction away from the first end.

As also illustrated in the Figures, this embodiment adopts a central support 500 shaped like a short cylinder formed integrally with the back plate 11 and rising from the center of a horizontal bottom 17 of the hemispheric convex portion 15 of the back plate 11, and a first solid end support 61 and a second end support 600. The central support 500 has formed in the top thereof a recess 501 extending on a line connecting the end supports 61 and 600 to each other. The recess 501 is widened out at the opposite ends thereof as will be evident when viewing it from above on FIG. 10. The bottom of the recess 501 has a down-slope toward either end thereof. The central support 500 has fixed at the top center thereof a pin 502 extending perpendicular to the recess 501.

Figure 10:
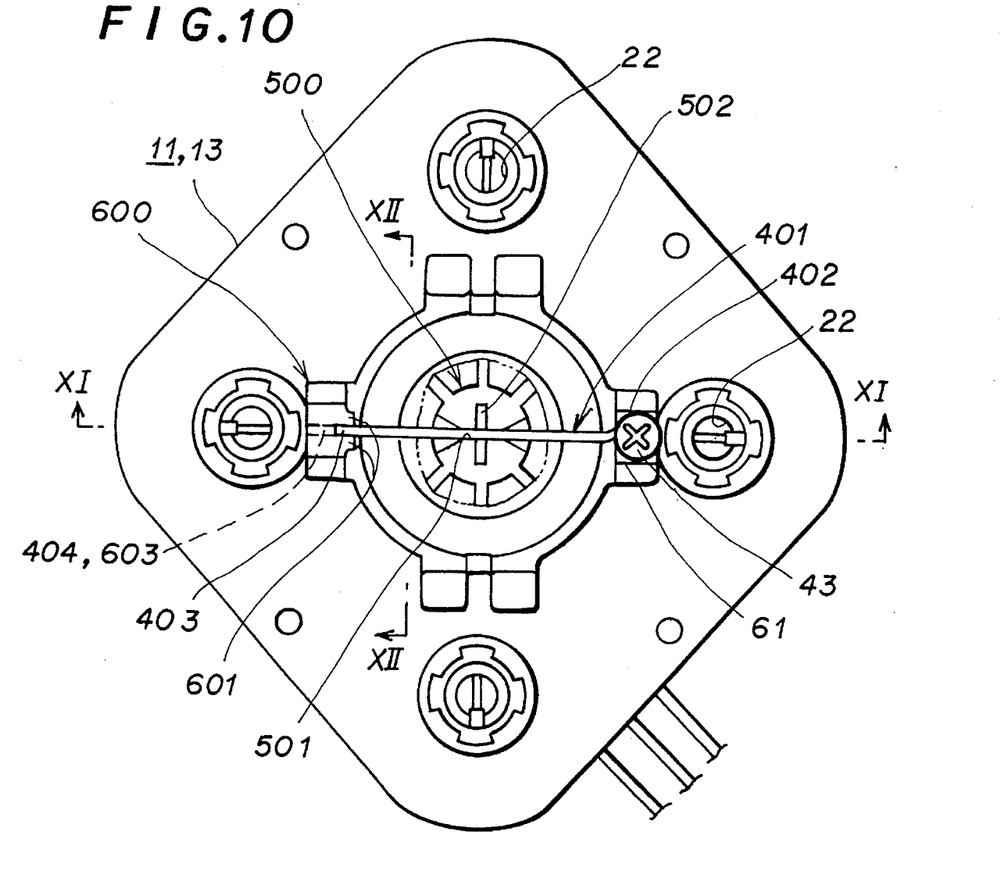
FIG. 10 is a partial plan view of a third embodiment of the car rearview mirror according to the present invention in which a wire spring is used to support the mirror unit on the mirror housing.
Figure 11:
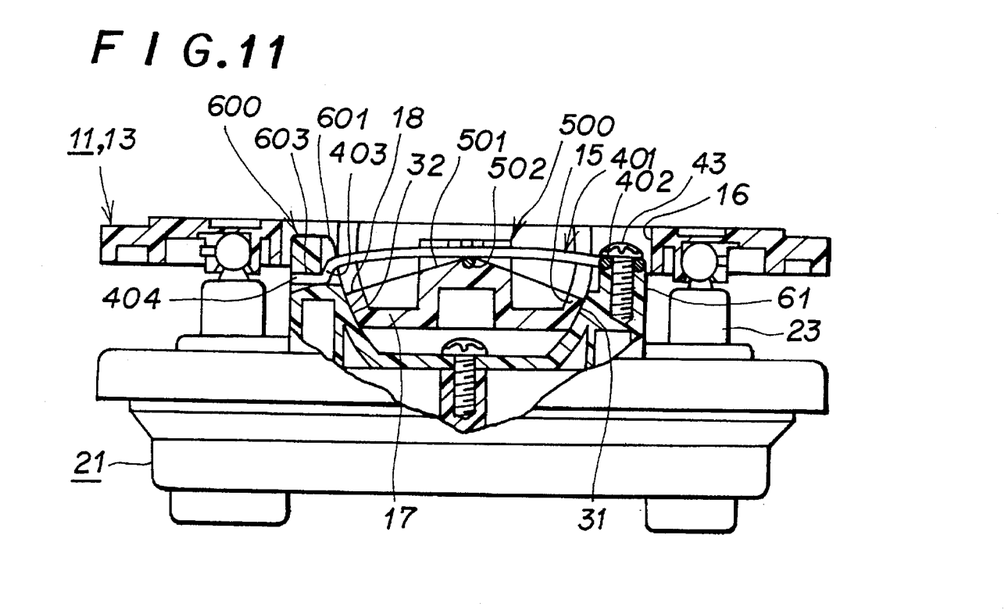
FIG. 11 is a partially sectional view of the third embodiment, taken along the line XI—XI in FIG. 10.
Figure 12:
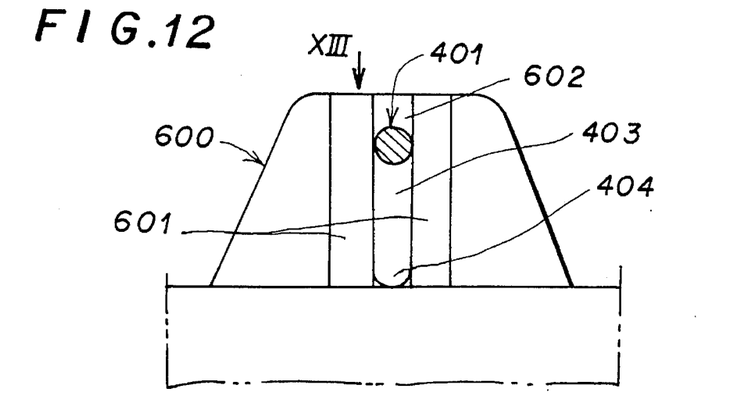
FIG. 12 is a fragmentary sectional view, enlarged in scale, taken along the line XII—XII in FIG. 10.
Figure 13:
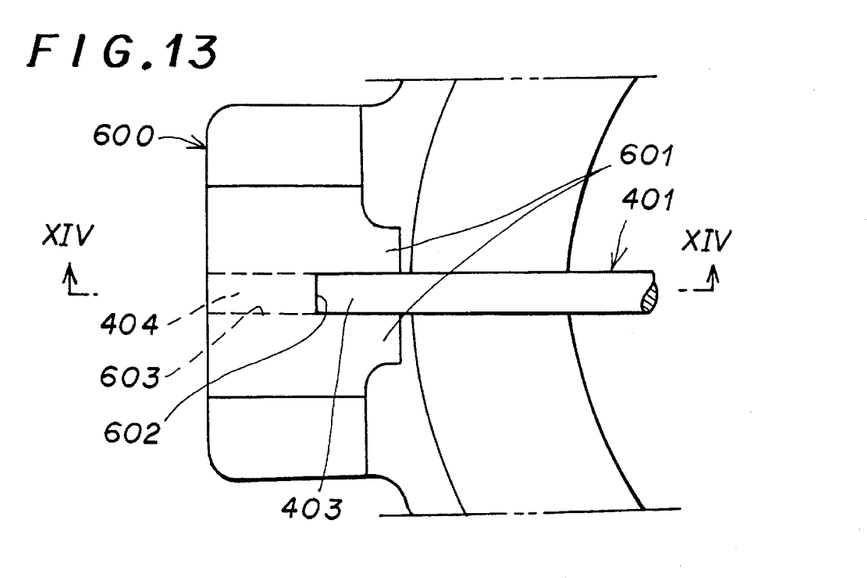
FIG. 13 is a view from arrow XIII in FIG. 12.

The hemispheric convexity 15 has formed therein on a line connecting the two end supports 61 and 600 to each other a recess 18 through which the wire spring 401 is passed.

Figure 14:
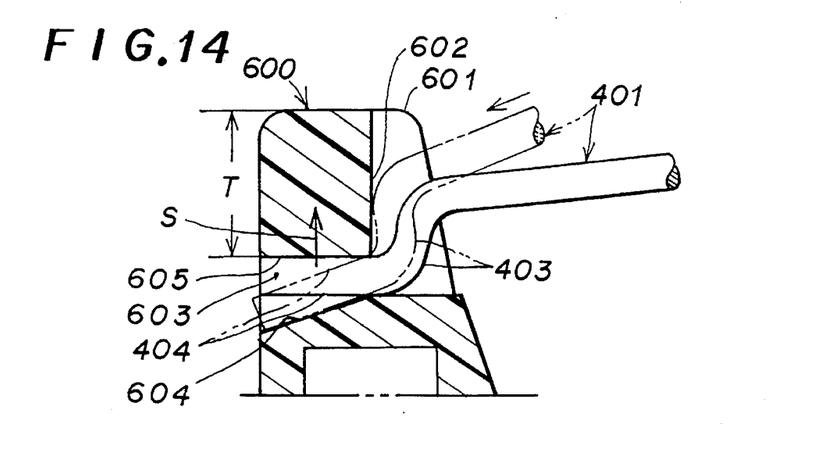
FIG. 14 is a sectional view taken along the line XIV—XIV in FIG. 13.
Figure 16:
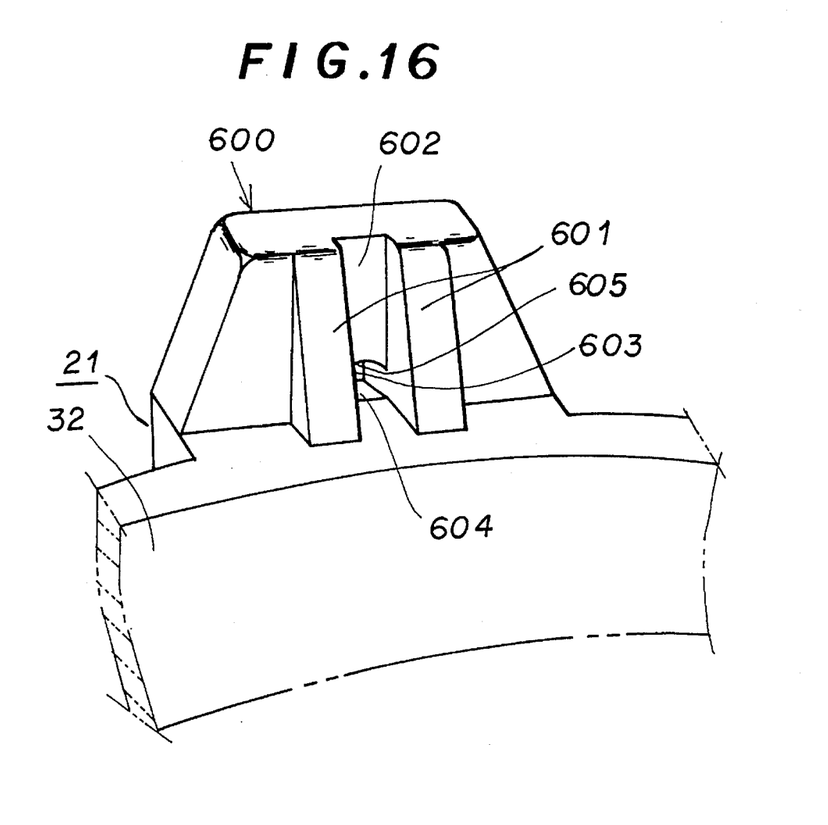
FIG. 16 is a perspective view, enlarged in scale, of the second end support.

The second end support 600 at which the wire spring 401 is retained has two abutments 601 rising axially of the screw 43 driven into the first solid support 61, and has formed in a portion 602 thereof between the two abutments 601 a through-hole 603 having a horizontal upper wall or ceiling 605 and a bottom 604 inclined as shown in FIG. 14.

To assemble the rearview mirror according to this embodiment, the extreme portion 404 of the cranked end of the wire spring 401 is put between the abutments 601 and inserted into the through-hole 603 in the second support 600 along the inclined bottom 604 of the through-hole 603 in the direction of arrow, which is indicated with two-dot dash line in FIG. 14, until the bend 403 of the wire spring 401 abuts the surface of the portion 602 of the second support 600. Thus the bend 403 is held at both the lateral sides thereof between the abutments 601 so that the wire spring 401 can be retained against rotation about the axis thereof. Then the wire spring 401 is applied at the center thereof onto the pin 502 at the top of the central support 500. The extreme portion 404 of the wire spring 401 is thus resiliently applied to the ceiling 605 and the center of the wire spring 401 has a substantial point contact with the pin 502. Further, the first end or looped end 402 of the wire spring 401 is fixed to the top of the first end support 61 with the screw 43. Thus, the wire spring 401 can be easily installed since the abutments 601 will block the bend 403 of the wire spring 401 against rotation of the wire spring 401 about the axis thereof.

It should be noted that the point of the contact of the center of the wire spring 401 with the pin 502 fixed to the top of the central support 500 generally coincides with the centers P of the hemispheric convex surface 31 and hemispheric concave surface 32.

The third embodiment of the car rearview mirror according to the present invention offers a same effect as the previously-mentioned first and second embodiments.

More specifically, according to this third embodiment, the second end of the wire spring 401 is cranked oppositely to a direction S in which the extreme portion 404 of the wire spring 401 is resiliently forced to the ceiling 605 of the through-hole 603 to form the bend 403 which in turn is further bent away from the first end of the wire spring 401. Owing to this shape of the wire spring 401, the second end support 600 can be made thicker (as indicated with T) at a portion above the ceiling 605 of the through-hole 603 at which the extreme portion 404 of the spring wire 401 is retained, so that the second end support 600 can be designed to have a greater rigidity.

Also, according to this embodiment, since the second end support 600 has the portion 602 which the bend 403 of the wire spring 401 abuts, whereby the looped end 402 can be positioned with respect to the first end support 61, the wire spring 401 can be more easily fixed to the first end support 61.

The aforementioned embodiments of the present invention are so-called remote-controllable rearview mirrors in which the power unit 21 is used to tilt the mirror unit 1 horizontally and vertically. It should be noted, however, that the present invention can be applied to any manually-controlled rearview mirror in which the mirror unit 1 is turned manually without the power unit 21. In this case, the mirror unit 1 is to be pivotably installed directly to the mirror housing 2.

Furthermore, in the aforementioned embodiments of the present invention, the hemispheric convex surface 31 is formed on the mirror unit 1 while the hemispheric concave surface 32 is on the mirror housing 2. Reversely, however, the mirror unit 1 and mirror housing 2 may have the hemispheric concave surface 32 and hemispheric convex surface 31 formed thereon, respectively.

Moreover, the aforementioned embodiments has the hemispheric convex surface 31 formed on the mirror unit 1 and the hemispheric concave surface 32 formed on the mirror housing 2. However, the hemispheric concave surface may be formed on the mirror unit 1 while the hemispheric convex surface may be formed on the mirror housing 2.

In the aforementioned embodiments, the back plate 11 of the mirror unit 1 is composed of the separate holder 12 and base 13. After the base 13 is pivotably installed to the power unit 21 in the mirror housing 2, it is fitted into the holder 12 to form together the back plate 11. However, the back plate 11 may be made of a single plate, not composed of such two pieces 12 and 13. In this case, after the back plate is pivotably installed to the mirror housing 2, the mirror body 10 is to be installed to the back plate to form the mirror unit 1.

What is claimed is:

1. A car rearview mirror, comprising:
   a mirror unit having a reflected surface on a front thereof, a hemispheric convex surface on a back thereof, said mirror unit further being provided with two windows;

means for supporting said mirror unit, said supporting means having a hemispheric concave surface; and means for forcing said hemispheric convex surface to said hemispheric concave surface to fit said mirror unit to said supporting means in such a manner that said mirror unit is pivotable in relation to said supporting means;

said forcing means including a central support provided on said mirror unit, two end supports provided on said supporting means corresponding to said windows of the mirror unit, and an elongated leaf spring that is retained at a center and opposite ends, respectively, thereof by means of said central and two end supports in a bowed state, said two end supports being fitted to said windows of said mirror unit to prevent said mirror unit from being oscillated about an axis of said hemispheric convex surface.

2. A car rearview mirror according to claim 1, wherein said supporting means includes a mirror housing having a front opening, and a power unit disposed in said mirror housing and adapted to be remote-controlled to turn said mirror unit vertically and horizontally, wherein said power unit has formed integrally thereon said hemispheric concave surface and said two end supports, and wherein said mirror unit is installed to said mirror housing by means of said power unit such that said mirror unit is pivotable and said reflecting surface is positioned in said front opening of said mirror housing.

3. A car rearview mirror according to claim 2, wherein said mirror unit further comprises a mirror body having said reflecting surface formed on the front thereof; and a back plate disposed at the back of said mirror body, said back plate comprising a holder to hold said mirror body along a circumference of said mirror body and a base having formed integrally thereon said hemispheric convex surface and said central support, said holder and base being separate pieces and fitted to each other to form together said back plate.

4. A car rearview mirror according to claim 2, wherein said leaf spring is fixed, with a screw, to at least one of said end supports.

5. A car rearview mirror according to claim 2, wherein said central support has a conical shape, said leaf spring has a small concavity formed in the center thereof, and the top of said central support is fitted in said concavity.

6. A car rearview mirror, comprising:

a mirror unit having a reflecting surface on a front thereof, a hemispheric convex surface on a back thereof, said mirror further being provided with two windows;

means for supporting said mirror unit, said supporting means having a hemispheric concave surface; and means for forcing said hemispheric convex surface to said hemispheric concave surface to fit said mirror unit to said supporting means such that said mirror unit is pivotable in relation to said supporting means;

said forcing means including a central support provided on said mirror unit, two end supports provided on said supporting means corresponding to said windows of the mirror unit, and a wire spring having a circular section and being retained at a center and opposite ends, respectively, thereof by means of said central and two end supports in a bowed state, said two end supports being fitted to said windows of said mirror unit to prevent said mirror unit from being oscillated about an axis of said hemispheric convex surface.

7. A car rearview mirror according to claim 6, wherein said supporting means includes a mirror housing having a front opening, and a power unit disposed in said mirror housing end adapted to be remote-controlled to turn said mirror unit vertically and horizontally, wherein said power unit has formed integrally thereon said hemispheric concave surface and said two end supports, and wherein said mirror unit is installed to said mirror housing by means of said power unit such that said mirror unit is pivotable and said reflecting surface is positioned in said front opening of said mirror housing.

8. A car rearview mirror according to claim 7, wherein said mirror unit further comprises a mirror body having said reflecting surface formed on the front thereof, and a back plate disposed at the back of said mirror body, said back plate comprising a holder to hold said mirror body along a circumference of said mirror body and a base having formed integrally thereon said hemispheric convex surface and said central support, said holder and base being separate pieces and fitted to each other to form together said back plate.

9. A car rearview mirror according to claim 7, wherein said central support has a conical shape, said conical shape having a recess formed on a top thereof, wherein a width and a depth of the recess are about equal to an outer diameter of said wire spring and in which said wire spring is received as fitted at the center thereof.

10. A car rearview mirror according to claim 7, wherein said central support has a conical shape, said conical shape having a recess formed on a top thereof, wherein a width and a depth of the recess are about equal to an outer diameter of said wire spring, said central support including a bottom having a circular section with which said wire spring is supported at the center thereof in a substantial point contact.

11. A car rearview mirror according to claim 7, wherein each of said two end supports has formed therein a recess extending perpendicular to a deflecting direction of said wire spring, said wire spring is retained on a wall surface of said recess, and said recess has formed at an edge of an opening thereof a stopper to which an end of said wire spring abuts, thereby preventing said wire spring from being disengaged from inside said recess.

12. A car rearview mirror according to claim 7, wherein said wire spring is supported at the center thereof in a substantial point contact on a pin fixed to the top of said central support perpendicularly to said wire spring, one end of said wire spring is looped and fixed to one of said two end supports with a screw, the other of said two end supports has two abutments extending axially of said screw and between which a through-hole is formed, and said wire spring is ended at the second end thereof by a crank consisting of a bend extending generally in parallel with the central axis through said looped end and which is set between said two abutments to prevent said wire spring from rotating about an axis of said two abutments and an extreme portion contiguous to said bend and extending straight in a direction away from the first end, said extreme portion being inserted into said through-hole and retained at a wall of said through-hole.

13. A car rearview mirror, comprising:

a mirror unit having a reflecting surface on a front thereof and a hemispheric convex surface on a back thereof;

means for supporting said mirror unit, said supporting means having a hemispheric concave surface; and means for forcing said hemispheric convex surface to said hemispheric concave surface to fit said mirror unit to said supporting means in such a manner that said mirror unit is pivotable in relation to said supporting means;

said forcing means including a central support provided on said mirror unit, two end supports provided on said supporting means, and a wire spring having a circular section and being retained at a center and opposite ends, respectively, thereof by means of said central and two end supports in a bowed state, said wire spring being supported at the center thereof in a substantial point contact on a pin fixed to a top of said central support perpendicularly to said wire spring, one end of said wire spring being looped and fixed to one of said two end supports with a screw, the other of said end supports having two abutments extending axially of said screw and between which a through hole is formed, and said wire spring being ended at the second end thereof by a crank consisting of a bend extending generally in parallel with the central axis through said looped end and which is to be set between said two abutments to prevent said wire spring from rotating about the axis of the two abutments and an extreme portion contiguous to said bend and extending straight in a direction away from the first end, said extreme portion inserted into said through-hole and retained at a wall of said through-hole.

* * * * *